(12) United States Patent
Kitazawa et al.

(10) Patent No.: US 10,203,354 B2
(45) Date of Patent: Feb. 12, 2019

(54) CANTILEVER FOR A SCANNING TYPE PROBE MICROSCOPE

(71) Applicants: National University Corporation Nagoya Institute of Technology, Nagoya-shi, Aichi (JP); OLYMPUS CORPORATION, Tokyo (JP)

(72) Inventors: Masashi Kitazawa, Nagareyama (JP); Michitsugu Arima, Tsukuba (JP); Masaki Tanemura, Nagoya (JP)

(73) Assignees: National University Corporation Nagoya Institute of Technology, Nagoya-shi, Aichi (JP); OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/850,430

(22) Filed: Dec. 21, 2017

(65) Prior Publication Data

US 2018/0136253 A1    May 17, 2018

Related U.S. Application Data

(63) Continuation of application No. PCT/JP2015/069311, filed on Jul. 3, 2015.

(51) Int. Cl.
*G01Q 60/54* (2010.01)
*G01Q 60/56* (2010.01)
(Continued)

(52) U.S. Cl.
CPC ............ *G01Q 60/54* (2013.01); *G01Q 60/56* (2013.01); *G01Q 70/10* (2013.01); *G01Q 70/12* (2013.01)

(58) Field of Classification Search
CPC ........ G01Q 60/00; G01Q 60/24; G01Q 60/38; G01Q 60/40; G01Q 60/50; G01Q 60/54;
(Continued)

(56) References Cited

U.S. PATENT DOCUMENTS

| 6,121,771 | A | 9/2000 | Moser | |
|---|---|---|---|---|
| 2004/0226464 | A1* | 11/2004 | Mirkin | G01Q 70/06 101/483 |
| 2012/0291161 | A1* | 11/2012 | Zhang | G01Q 60/56 850/56 |

FOREIGN PATENT DOCUMENTS

| JP | 2004150839 A | 5/2004 |
|---|---|---|
| JP | 2005308675 A | 11/2005 |

(Continued)

OTHER PUBLICATIONS

International Search Report dated Oct. 6, 2015 issued in PCT/JP2015/069311.

*Primary Examiner* — Jason McCormack
(74) *Attorney, Agent, or Firm* — Scully, Scott, Murphy & Presser, P.C.

(57) ABSTRACT

The present invention provides a cantilever for a scanning type probe microscope, the cantilever including a support portion, a lever portion extending from the support portion, a protrusion portion formed on a free end side of the lever portion, an apex angle of the protrusion portion being an acute angle, and a probe in which a fine wire formed at a distal end of the protrusion portion is coated with a functional film, and a major axis/minor axis ratio of a cross-sectional shape of the probe is smaller than a major axis/minor axis ratio of a cross-sectional shape of the fine wire.

8 Claims, 5 Drawing Sheets

(51) Int. Cl.
*G01Q 70/12* (2010.01)
*G01Q 70/10* (2010.01)

(58) Field of Classification Search
CPC ........ G01Q 70/00; G01Q 70/08; G01Q 70/10; G01Q 70/12; G01Q 70/16
USPC ........ 850/21, 33, 40, 41, 42, 45, 46, 48, 52, 850/56, 57, 58, 60
See application file for complete search history.

(56) References Cited

FOREIGN PATENT DOCUMENTS

| | | | |
|---|---|---|---|
| JP | 2006084449 A | 3/2006 | |
| JP | 2006267113 A | 10/2006 | |
| JP | 2012233845 A | 11/2012 | |

\* cited by examiner

FIG. 9A
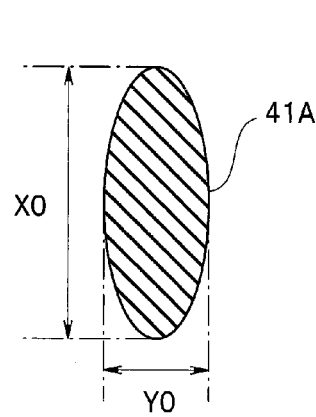
FIG. 9B
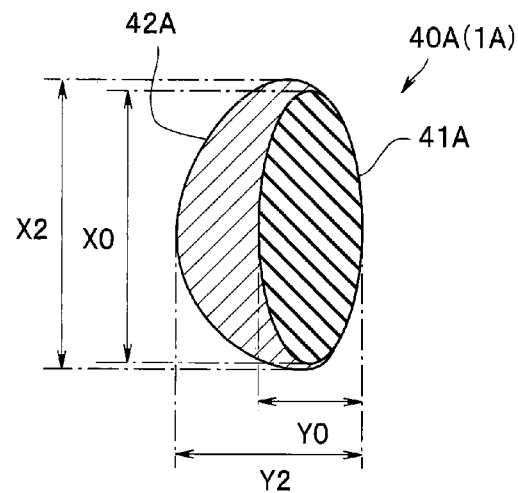
FIG. 10A   FIG. 10B   FIG. 10C
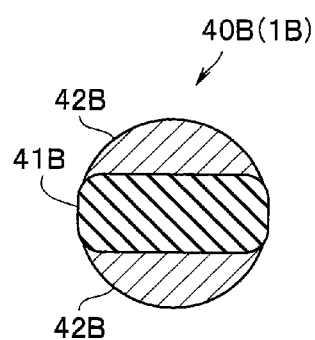 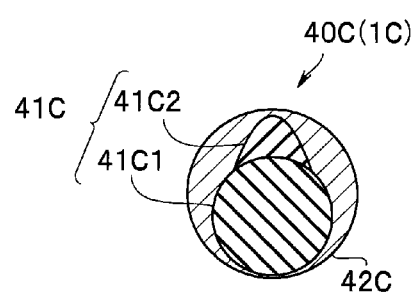 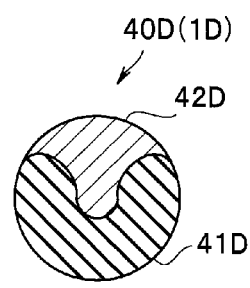

CANTILEVER FOR A SCANNING TYPE PROBE MICROSCOPE

CROSS REFERENCE TO RELATED APPLICATION

This application is a continuation application of PCT/JP2015/069311 filed on Jul. 3, 2015, the entire contents of which are incorporated herein by this reference.

BACKGROUND OF THE INVENTION

1. Field of the Invention

The present invention relates to a cantilever used for a scanning type probe microscope.

2. Description of the Related Art

Scanning probe microscopes (SPMs) are configured to keep a distance between a probe and a sample on the order of nanometers and detect a tunnel current produced between the probe and the sample or a physical quantity such as an interatomic force to thereby measure a fine shape. An SPM has atomic order measurement resolution and is used to measure surface shapes of semiconductors, optical disks, biological samples or the like.

Japanese Patent Application Laid-Open Publication No. 2005-308675 discloses a cantilever for a scanning type probe microscope provided with a support portion, a lever portion extending from the support portion, a protrusion portion formed on a free end side of the lever portion, an apex angle at a distal end of the protrusion portion being an acute angle, and a probe made of a fine wire such as carbon nanofiber formed at the distal end of the protrusion portion.

Furthermore, a cantilever provided with a probe with a functional film formed on its surface has a higher function. Japanese Patent Application Laid-Open Publication No. 2006-84449 discloses a probe for magnetic force microscopy (MFM) made of a nonmagnetic material with a magnetic body film formed on its surface.

Note that Japanese Patent Application Laid-Open Publication No. 2004-150839 discloses a cantilever, a probe distal end of which is sharpened using a low-temperature thermal oxidation method.

SUMMARY OF THE INVENTION

A cantilever according to an embodiment of the present invention is a cantilever for a scanning type probe microscope including a support portion, a lever portion extending from the support portion, a protrusion portion formed on a free end side of the lever portion, an apex angle of the protrusion portion being an acute angle, and a probe in which a fine wire formed at a distal end of the protrusion portion is coated with a functional film, in which a major axis/minor axis ratio of a cross-sectional shape of the probe is smaller than a major axis/minor axis ratio of a cross-sectional shape of the fine wire.

BRIEF DESCRIPTION OF THE DRAWINGS

FIG. 9A is a cross-sectional view of a fine wire of the cantilever according to modification 1 of the embodiment;

FIG. 9B is a cross-sectional view of a probe of the cantilever according to modification 1 of the embodiment;

FIG. 10A is a cross-sectional view of a probe of a cantilever according to modification 2 of the embodiment;

FIG. 10B is a cross-sectional view of a probe of a cantilever according to modification 3 of the embodiment; and FIG. 10C is a cross-sectional view of a probe of a cantilever according to modification 4 of the embodiment.

DETAILED DESCRIPTION OF THE PREFERRED EMBODIMENT

<Configuration of Cantilever>

Figure 1:
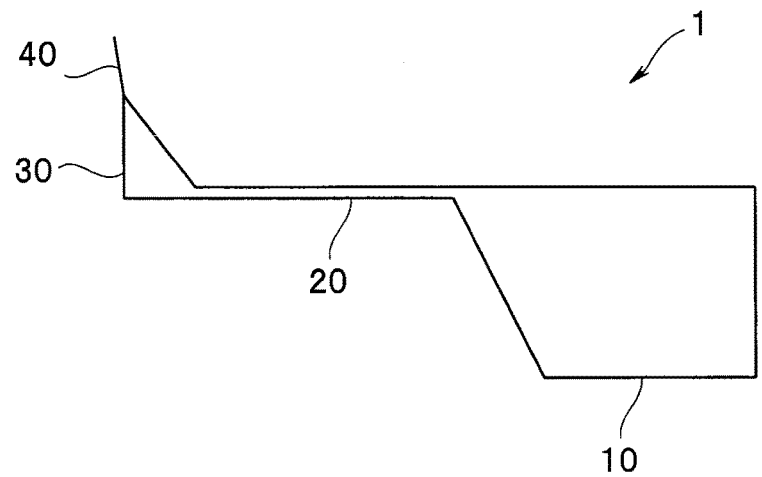
FIG. 1 is a side view of a cantilever according to an embodiment.

FIG. 1 is a side view of a cantilever 1 for a scanning type probe microscope according to an embodiment. The cantilever 1 is provided with a support portion 10, a lever portion 20, a protrusion portion 30 and a probe 40. The lever portion 20 which is a cantilever extends from the support portion 10. The protrusion portion 30 is formed on a free end side of the lever portion 20 and an apex angle at a distal end of the protrusion portion 30 is an acute angle. The probe 40 having a high aspect ratio is formed at a distal end of the protrusion portion 30. The support portion 10, the lever portion 20 and the protrusion portion 30 are created, for example, by processing a silicon substrate.

Figure 2:
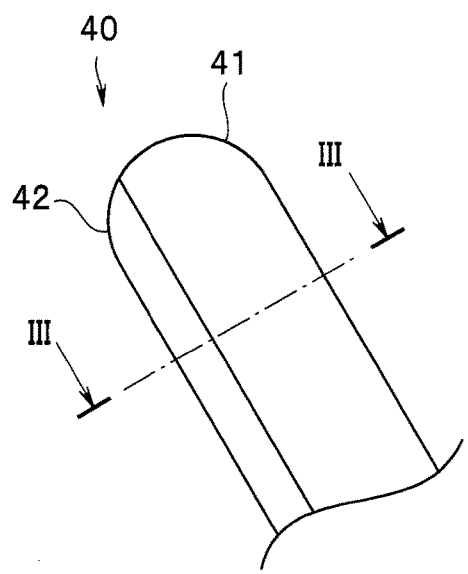
FIG. 2 is a side view of a probe of the cantilever of the embodiment.
Figure 3:
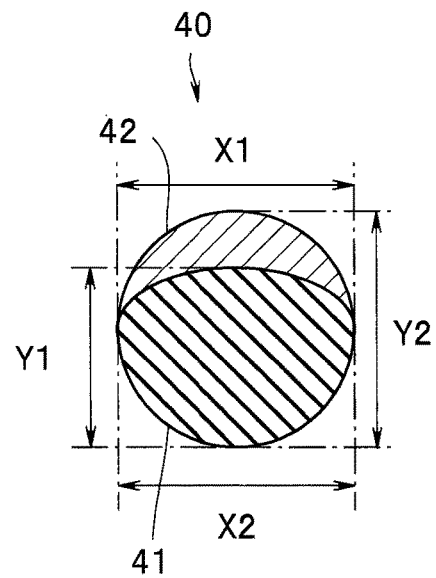
FIG. 3 is a cross-sectional view along a line in FIG. 2 of the probe of the cantilever of the embodiment.

As shown in FIG. 2 and FIG. 3, the probe 40 is formed of a fine wire 41 which is one carbon nanofiber (CNF) grown and formed from the distal end of the probe as a core wire, part of a side face of the fine wire 41 being coated with a magnetic body film 42 as a functional film.

In the cantilever 1, a major axis/minor axis ratio (X2/Y2) of a cross-sectional shape of the probe 40 is smaller than a major axis/minor axis ratio (X1/Y1) of a cross-sectional shape of the fine wire 41. For example, the major axis/minor axis ratio (X1/Y1) of the fine wire 41 exceeds 3.0. On the other hand, the major axis/minor axis ratio (X2/Y2) of the probe 40 on which the magnetic body film 42 is formed is 2.0 or less. Note that when the major axis/minor axis ratio (X1/Y1) of the fine wire 41 exceeds 2.0, the major axis/minor axis ratio (X2/Y2) of the probe 40 is preferably 1.5 or less.

That is, the cross-sectional shape of the fine wire 41 is not circular, and the cross-sectional shape of the probe 40 becomes more isotropic through the film formation of the magnetic body film 42, approximating to a perfect circle.

Although the major axis/minor axis ratio (X2/Y2) of the probe 40 is ideally 1.0, if it is 2.0 or less or preferably 1.5 or less, the ratio is unlikely to give rise to problems. On the contrary, the ratio can exceed 2.0 depending on use conditions.

Note that a "cross section" in the present specification refers to a surface orthogonal to a longitudinal direction at a place 10 nm to 200 nm from the distal end of the probe. The major axis/minor axis ratio is calculated, for example, from a maximum value/minimum value of a width when observed, for example, from a plurality of different directions orthogonal to the longitudinal direction of the probe. The major axis/minor axis ratio of the cross-sectional shape of the fine wire 41 of the probe 40 on which the magnetic body film 42 is formed can be acquired by selectively removing the magnetic body film 42 through wet etching.

The major axis/minor axis ratio may be observed and calculated, for example, by embedding the fine wire or the like in resin and exposing the cross section of the surface orthogonal to the longitudinal direction. Furthermore, the major axis/minor axis ratio may be calculated by thinning the fine wire or the like using a microtome method or the like and observing the fine wire using a transmission electron microscope.

The cantilever 1 is provided with the high function probe 40 which is coated with a magnetic body film. Since the probe 40 has a substantially circular cross section, for example, its major axis/minor axis ratio (X2/Y2) is, for example, 2.0 or less, the probe 40 has resolution uniform in an in-plane direction. Furthermore, since the probe 40 has an outside diameter substantially identical to the size of the major axis of the fine wire 41, the probe 40 has high resolution. That is, the cantilever 1 has high resolution which is uniform in the in-plane direction.

<Method for Manufacturing Cantilever>

Next, a method for manufacturing the cantilever according to the present embodiment will be described using FIG. 4A to FIG. 4C.

Figure 4A:
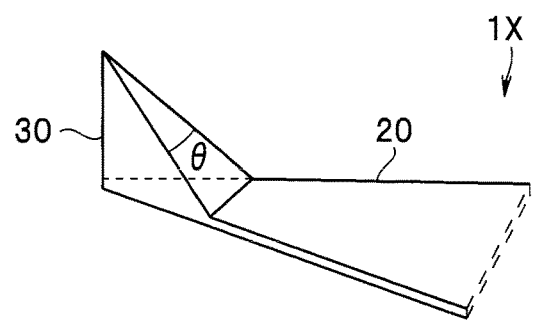
FIG. 4A is a perspective view for describing a method for manufacturing the cantilever of the embodiment.

A cantilever 1X formed of a silicon material as shown in FIG. 4A is provided. The cantilever 1X is provided with the lever portion 20 extending from the support portion (not shown) created by processing a mono-crystal silicon wafer and the protrusion portion 30 disposed on the free end side of the lever portion 20. The protrusion portion 30 is of a tetrahedral type made up of two planes perpendicular to the top surface of the lever portion 20 and a (111) plane that forms an angle of approximately 55 degrees.

Note that the distal end of the protrusion portion 30 may be sharpened using a publicly known method such as low temperature thermal oxidation treatment.

Figure 4B:
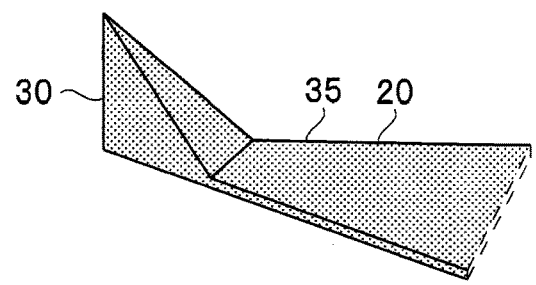
FIG. 4B is a perspective view for describing a method for manufacturing the cantilever of the embodiment.
Figure 4C:
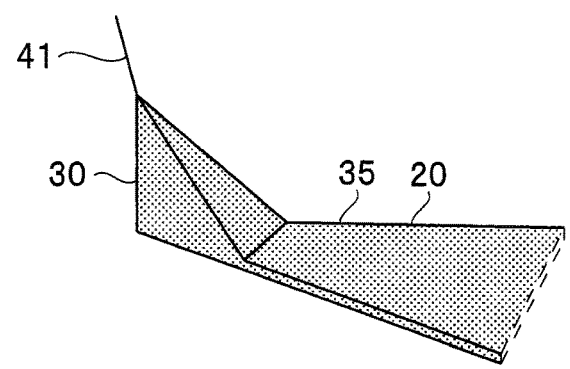
FIG. 4C is a perspective view for describing a method for manufacturing the cantilever of the embodiment.

Next, as shown in FIG. 4B, a carbon film 35 made of, for example, graphite is formed on the surface of the cantilever 1X to a thickness of, for example, several nm to several μm using a sputtering method or vapor deposition method. Equivalent effects can be obtained from the carbon film 35 over a wide film thickness range. Next, as shown in FIG. 4C, when a high-energy beam is radiated in a vacuum apparatus, one fine wire 41 selectively grows from the distal end of the protrusion portion 30. Note that the carbon film 35 will not be shown in the following drawings.

Figure 5:
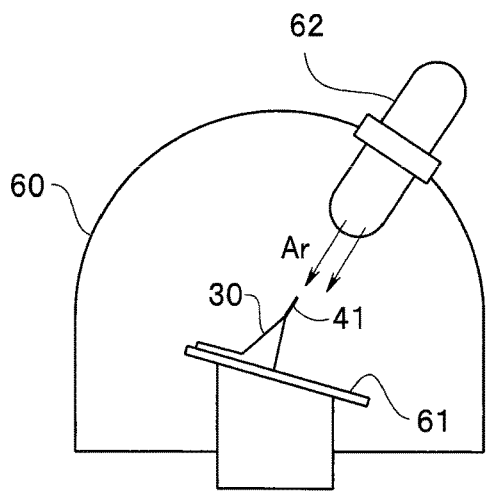
FIG. 5 is a schematic view of a manufacturing apparatus of the cantilever of the embodiment.

As shown in FIG. 5, a vacuum apparatus 60 includes an ion gun 62 for irradiation of a high-energy beam having a beam diameter of several mm to several tens of cm and a stage 61. The cantilever 1X is disposed on the stage 61 such that the ion irradiation direction of the ion gun 62 becomes parallel to the direction in which the fine wire 41 is made to grow.

The fine wire 41 on the order of 1 μm is made to grow from the protrusion portion 30 through ion irradiation for 1 to 100 minutes under conditions with an argon atmosphere, a vacuum degree of $10^{-2}$ to $10^{-8}$ Pa, preferably $10^{-3}$ to $10^{-5}$ Pa, acceleration voltage of 0.1 keV to 30 keV, average ion current density of 2 $\mu A/cm^2$ to 10 $mA/cm^2$, sputtering speed of 2 nm/min to 1 μm/min, and at room temperature. That is, irradiation of the ion beam causes carbon atoms of the carbon film 35 to move, causing one fine wire 41 made of a CNF to selectively grow in the protrusion portion 30.

Note that the fine wire may also be made to grow while heating the cantilever 1X, for example, to 500° C. to 600° C. or contrarily cooling the cantilever 1X down, for example, to −150° C. By changing the temperature during irradiation of the ion beam, it is possible to control the film quality and the growth speed of the fine wire 41.

Furthermore, by changing the current density and the acceleration voltage of the ion beam, it is possible to change the sputtering speed. Furthermore, it is possible to radiate not only argon ions in an argon atmosphere but also radiate helium ions, neon ions or xenon ions or radiate reactive gas ions such as nitrogen ions, oxygen ions or ions containing a CH group. Note that the above-described generation conditions of the fine wire are examples and it goes without saying that the generation conditions of the fine wire are not limited to them.

In the present embodiment, the tetrahedral shape has been described as the shape of the protrusion portion 30 of the cantilever 1, but if the apex angle is an acute angle, pyramidal shape or polygonal pyramid-like shape or if it is a conical protrusion portion, similar effects are obtained. Furthermore, the material of the protrusion portion 30 of the cantilever 1 need not be silicon, but may be, for example, silicon nitride or may be a material different from the material of the lever portion 20 or the support portion 10.

The graphite film has been described as the carbon film 35 to be formed on the cantilever 1X, but the carbon film 35 is not limited to this, and a film containing carbon element such as silicon carbide (SiC), glassy carbon (g-C), diamond-like carbon (DLC), amorphous carbon (a-C), titanium carbide (TiC), tungsten carbide (WC), chromium carbide (CrC), vanadium carbide (VC) or niobium carbide (NbC) can obtain similar effects. Furthermore, a CVD method or the like may be used as the film formation method for the carbon film 35. The periphery of the cantilever 1X including the cantilever 1X may be created using a carbon compound.

FIG. 4B has illustrated the cantilever 1X, the entire surface except the bottom surface of the cantilever 1X being coated, but only one plane may be coated without being limited to this.

Furthermore, a CNF has been shown as the fine wire 41 made of carbon to be formed on the protrusion portion 30, but, without being limited to this, a graphite nanotube (GNT) can also be made to grow by controlling temperature, growth speed and atmosphere to obtain similar effects.

Without forming a carbon compound on the protrusion portion 30, the fine wire 41 may also be formed, for example, by radiating a high-energy beam simultaneously with supplying a carbon compound in the vicinity of the probe. In this case, an ion irradiation source is necessary which introduces a carbon-based gas into the vacuum apparatus 60, ionizes and radiates the gas.

A high-energy beam may also be radiated onto the protrusion portion 30 while supplying elements (metal particles) such as Mo, Ta, W or Ti. In this case, it is possible to control the growth of the fine wire 41, more specifically, the thickness, growth speed and diameter. However, when the above-described metal particles are supplied to the vacuum apparatus 60, a film formation mechanism such as sputtering, arc plasma, laser ablation, electron beam vapor deposition is necessary separately.

A case has been shown where the fine wire 41 is formed and made to grow using an ion beam as the high-energy beam, but a high-energy beam such as a laser beam, electron beam or high-density plasma may also be used in addition to the ion beam.

Note that the fine wire 41 made of various materials can be used, and carbon nanofiber or graphite nanofiber is especially preferable. Furthermore, as already described, it is especially preferable that the protrusion portion 30 be made of silicon or silicon nitride because this facilitates manufacturing.

Figure 6A:
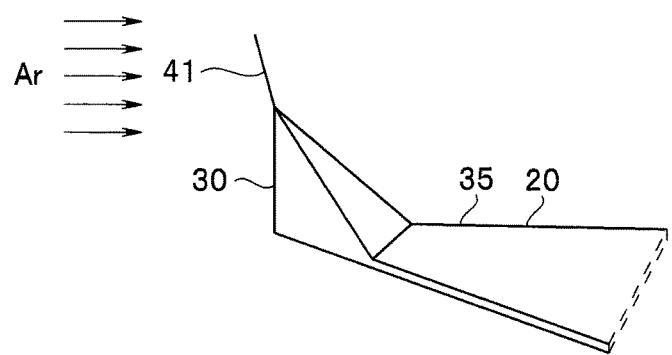
FIG. 6A is a perspective view for describing a method for manufacturing the cantilever of the embodiment.
Figure 6B:
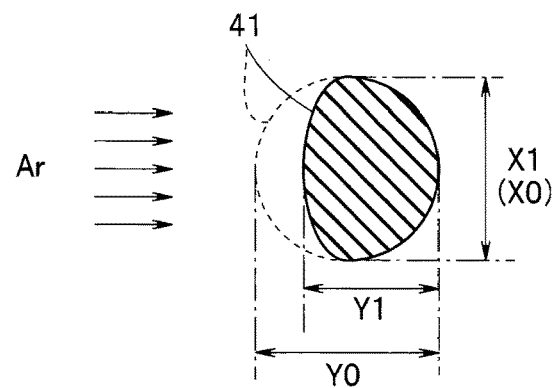
FIG. 6B is a cross-sectional view of a fine wire of the cantilever of the embodiment.

The fine wire 41 grown from the protrusion portion 30 may have a circular shape, the major axis/minor axis (X0/Y0) ratio of which is substantially 1 (see FIG. 6B). In this case, as has already been described, if the fine wire 41 is coated with a functional film so as to have a high function, the diameter of the probe may increase or the major axis/minor axis ratio may increase.

For this reason, according to the method for manufacturing a cantilever of the present embodiment, an ion milling process is performed which increases the major axis/minor axis ratio of the cross-sectional shape of the fine wire 41.

For example, as shown in FIG. 6A, an ion beam is radiated from ahead of the protrusion portion 30 of the cantilever, that is, not from the lever portion 20 side. Then, one side of the fine wire 41 is milled as shown in FIG. 6B. As the milling time is increased, the major axis/minor axis ratio (X1/Y1) of the cross-sectional shape of the fine wire 41 increases. Ion milling process is performed until the major axis/minor axis ratio reaches a predetermined value. The predetermined value of the major axis/minor axis ratio of the fine wire 41 after ion milling is over 2.0, for example, over 3.0 depending on the thickness of the magnetic body film 42 to be coated, but if an upper limit is, for example, 10.0 or less, the fine wire 41 is never broken.

Figure 7A:
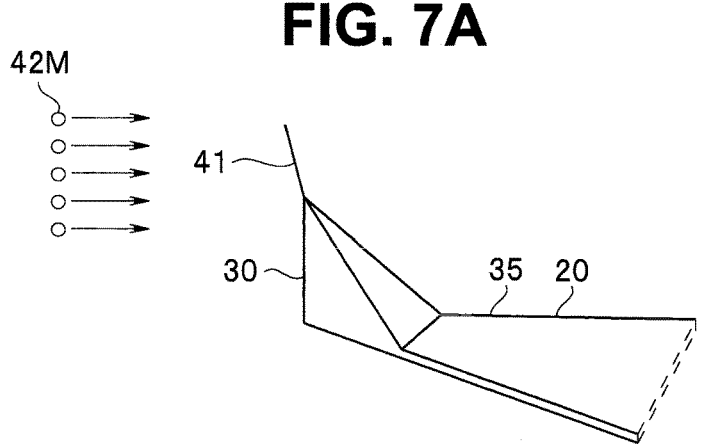
FIG. 7A is a perspective view for describing a method for manufacturing the cantilever of the embodiment.
Figure 7B:
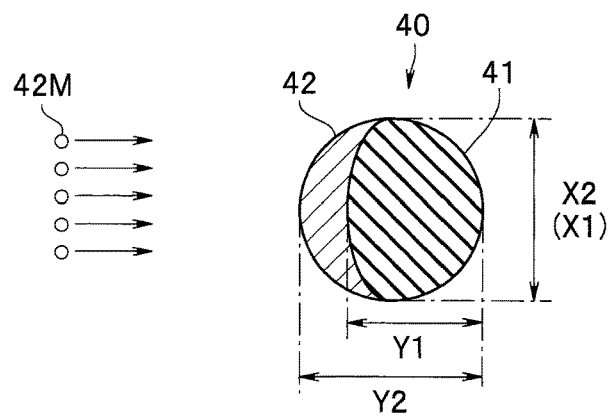
FIG. 7B is a cross-sectional view of a probe of the cantilever of the embodiment.

Next, as shown in FIG. 7A, the milled portion of the fine wire 41 is coated with magnetic body atoms 42M supplied from ahead of the protrusion portion 30 of the cantilever, that is, not from the lever portion 20 side. Then, as shown in FIG. 7B, the major axis/minor axis ratio of the probe 40 where the surface of the fine wire 41 is coated with the magnetic body film 42 is, for example, 2.0 or less or preferably 1.5 or less.

For example, the cross section of the fine wire 41 is substantially a circle having a diameter of 20 nm to 60 nm, and 5 nm to 30 nm is removed by etching through a milling process. The etched portion is coated with the magnetic body film 42 having, for example, a thickness equivalent to the amount of etching.

According to the conventional method, the probe needs to be rotated during film formation for uniform coating of the functional film on an outer circumferential surface of the probe, which causes the configuration of the film formation apparatus to become complicated. Furthermore, when the functional film is uniformly formed on the outer circumferential surface of the probe, the film thickness of the functional film is added to the thickness of the probe. This causes the outside diameter of the probe to become greater and causes the resolution to deteriorate. When the functional film is formed on only part of the outer circumferential surface of the probe having a circular cross section, the major axis/minor axis ratio of the cross section increases. Therefore, the resolution of an acquired image varies in the XY direction (in-plane direction).

In contrast, in the cantilever 1 of the present embodiment, the major axis/minor axis ratio of the cross-sectional shape of the fine wire 41 is, for example, over 3.0, whereas the major axis/minor axis ratio of the cross-sectional shape of the probe 40 coated with the magnetic body film 42 is 2.0 or less.

In other words, the method for manufacturing the cantilever 1 of the present embodiment includes a step of forming the fine wire 41 at a distal end of the protrusion portion 30, a step of processing the fine wire 41 until the major axis/minor axis ratio of the cross-sectional shape becomes over a predetermined value (2.0 to 3.0) and a step of coating the surface of the fine wire 41 with the functional film 42 and creating the probe 40, the major axis/minor axis ratio of the cross-sectional shape of which is 2.0 or less or preferably 1.5 or less.

A vapor deposition method or a sputtering method is used for coating of the magnetic body film 42. The magnetic body film 42 is a monolayer film or multilayer film containing a material selected from among iron, cobalt, nickel, and CoPtCr, NiFe, SmCo or the like according to specifications of magnetic characteristics such as a coercive force, saturation magnetic flux density, and squareness ratio.

Regarding the coating with the magnetic body film 42, since the magnetic body atoms 42M are not supplied from the lever portion 20 side, there are not so many magnetic bodies coated on the lever portion 20. This prevents the resolution from deteriorating due to the magnetic body coated on the lever portion 20.

Note that even when the magnetic body is supplied from one direction, the magnetic body film may be coated on an unmilled portion due to wraparound or the like. However, since the thickness differs in a circumferential direction, the major axis/minor axis ratio can be reduced by coating. That is, the magnetic body film is preferably coated on only part of the fine wire in the circumferential direction, but the magnetic body film may also be coated on the entire circumference.

A magnetic body film has been described above as an example of the functional film. However, a conductive film, a wear-resistant film or the like may also be coated as the functional film.

Since a cantilever using a fine wire coated with a conductive film, for example, of Pt, Au or the like to a thickness of 20 nm as a probe has low electric resistance, it is possible to measure a capacity of a micro region using SCM (scanning capacitance microscopy), measure resistivity using SSRM (scanning spreading resistance microscopy) or acquire a surface shape and potential images using KFM (Kelvin probe force microscopy). A cantilever coated with a wear-resistant film (e.g., tungsten, diamond or diamond-like carbon) can be used for a long period of time.

Note that it is especially preferable that the major axis/minor axis ratio of the cross-sectional shape of the probe 40 be set to 1.2 or less in order to achieve uniform resolution in the XY direction.

<Modification>

Next, cantilevers 1A to 1D according to modifications will be described. Since the cantilevers 1A to 1D are similar to the cantilever 1 and have the same effects, components having the same functions are assigned the same reference numerals and description is omitted.

<Modification 1>

Figure 8:
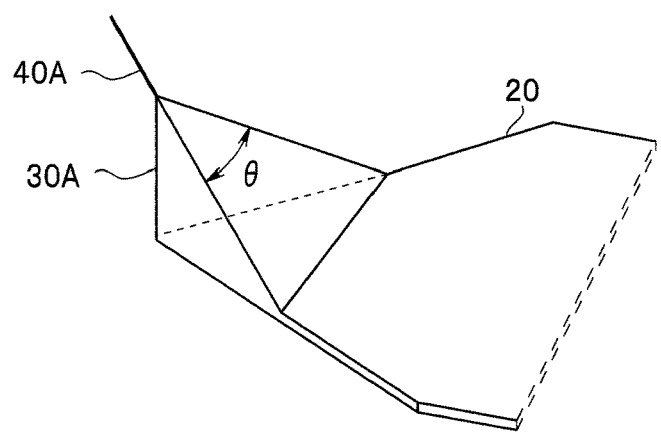
FIG. 8 is a perspective view for describing a method for manufacturing a cantilever according to modification 1 of the embodiment.

With the cantilever 1, an apex angle θ of the protrusion portion 30 is 10 degrees. In contrast, the apex angle θ of a protrusion portion 30A in a cantilever 1A in modification 1 shown in FIG. 8 is 25 degrees. As has already been described, the cross section of the fine wire 41 has a substantially circular shape. However, the cross section of the fine wire grown from the protrusion portion 30 having an apex angle of over 15 degrees or especially over 20 degrees is a substantially ellipsoidal shape.

Particularly when the major axis/minor axis ratio of the fine wire is set to over 3.0, the protrusion portion 30 preferably has an apex angle θ of over 30 degrees. Note that the apex angle θ needs only to be an acute angle, that is, less than 90 degrees, but it is preferably 45 degrees or less so as to set the major axis/minor axis ratio of the fine wire to 10.0 or less and allow the fine wire to grow stably.

Note that when the protrusion portion 30 is a pyramid, the apex angle θ is an angle of the distal end of the plane facing the top surface of the lever portion when seen from the fixed end side (support portion 10 side) of the top surface of the lever portion among the planes constituting the pyramid. Alternatively, when the protrusion portion 30 is a cone, the apex angle θ is an angle formed by two sides crossing each other when seen from the fixing end side of the top surface of the lever portion. For example, in the case of a regular triangular pyramid, all the apex angles of the three planes are the same, and in the case of a cone, all the apex angles are the same in a side view from any direction.

As shown in FIG. 9A, a fine wire 41A grown from the protrusion portion 30A with the apex angle θ of 25 degrees has a major axis/minor axis ratio (X0/Y0) of 2.5, over 2.0. Therefore, the cantilever 1A does not require the milling process described using FIG. 6A (6B) to increase the major axis/minor axis ratio of the fine wire.

Of course, when the major axis/minor axis ratio of the fine wire 41A needs to be increased, for example, when a magnetic body film 42A is thickly coated, a milling process or the like may be further performed.

As shown in FIG. 9B, a probe 40A is created by coating a magnetic body film 42A in one direction of a side face of the fine wire 41A. The major axis/minor axis ratio (X2/Y2) of the cross section of a probe 40A is 1.5.

<Modification 2>

FIG. 10A illustrates a cross-sectional shape of a probe 40B of a cantilever 1B according to modification 2. The cross-sectional shape of a fine wire 41B of the probe 40B is a substantially rectangular shape. By changing the shape of the distal end of the probe and the fine wire growth condition, the cross-sectional shape of the fine wire 41B grown from the distal end of the probe is changed.

A magnetic body film 42B is coated from both sides orthogonal to the major axis direction of the fine wire 41B, and the major axis/minor axis ratio (X2/Y2) of the cross section of the probe 40B thereby becomes 1.1.

The closer the cross-sectional shape of the probe is to a perfect circle, that is, the closer the major axis/minor axis ratio (X2/Y2) is to 1, the more uniform resolution in the in-plane direction the cantilever has.

However, when the magnetic body film is coated from two directions, the lever portion 20 is also coated with more magnetic body films. For this reason, when coated with the magnetic body films from the two directions as in the case of the cantilever 1B, it is preferable to detach the magnetic body film coated on the lever portion 20 after the coating.

<Modification 3>

FIG. 10B illustrates a cross-sectional shape of a probe 40C of a cantilever 1C according to modification 3. A fine wire 41C1 of the probe 40C has a major axis/minor axis ratio (X1/Y1) substantially identical to that of the fine wire 41 of the cantilever 1, which is substantially 1. However, an AlN film 41C2 with strong internal stress is coated on one surface of the fine wire 41C1. For this reason, the major axis/minor axis ratio of the fine wire 41C1 including the AlN film 41C2 is large. Note that though not shown, the fine wire 41C1 is bent by the stress of the AlN film 41C2.

In the probe 40C, a magnetic body film 42C is coated from two directions orthogonal to the AlN film coating direction of the fine wire 41C (41C1+41C2). Therefore, the major axis/minor axis ratio (X2/Y2) of the cross section of the probe 40C is substantially 1.

Note that in the cantilever coated with a conductive film or a wear-resistant film, an influence of adhesion of the functional film to the lever portion 20 is small, and so the functional film need not be detached.

<Modification 4>

FIG. 10C illustrates a cross-sectional shape of a probe 40D of a cantilever 1D according to modification 4. A dent (groove) is formed at the center of a fine wire 41D of the probe 40D through processing using a focused ion beam (FIB).

Depending on coating conditions of the magnetic body film, the film thickness of the center part may increase. However, since the dent is formed at the center of the fine wire 41D, it is possible to easily set the major axis/minor axis ratio of the cross section of the probe 40D coated with the magnetic body film 42D to 1.5 or less.

The present invention is not limited to the aforementioned embodiment and modifications or the like, but various modifications, combinations and applications can be made without departing from the spirit and scope of the present invention.

What is claimed is:

1. A cantilever for a scanning type probe microscope comprising:
    a support portion;
    a lever portion extending from the support portion;
    a protrusion portion formed on a free end side of the lever portion, an apex angle of the protrusion portion being an acute angle; and
    a probe in which a wire formed at a distal end of the protrusion portion is coated with a functional film, wherein
    a major axis width/minor axis width ratio of a shape of a cross section orthogonal to a longitudinal direction of the probe is smaller than a major axis width/minor axis width ratio of a shape of a cross section orthogonal to a longitudinal direction of the wire, wherein the longitudinal direction extends from the distal end of the protrusion portion to a distal end of the probe.

2. The cantilever according to claim 1, wherein the major axis/minor axis ratio of the cross-sectional shape of the wire is over 3.0, and the major axis/minor axis ratio of the cross-sectional shape of the probe is equal to or less than 2.0.

3. The cantilever according to claim 1, wherein the major axis/minor axis ratio of the cross-sectional shape of the wire is over 2.0, and the major axis/minor axis ratio of the cross-sectional shape of the probe is equal to or less than 1.5.

4. The cantilever according to claim 1, wherein the wire is processed such that the major axis/minor axis ratio of the cross-sectional shape is over 2.0.

5. The cantilever according to claim 1, wherein the functional film is a conductive film, a magnetic body film or a wear-resistant film.

6. The cantilever according to claim 1, wherein the wire is carbon nanofiber or graphite nanofiber.

7. The cantilever according to claim 1, wherein the apex angle of the protrusion portion is equal to or greater than 15 degrees.

8. A cantilever for a scanning type probe microscope, comprising:
   a support portion;
   a lever portion extending from the support portion;
   a protrusion portion made of silicon or silicon nitride and formed on a free end side of the lever portion, an apex angle of the protrusion portion being an acute angle; and
   a probe in which a wire formed at a distal end of the protrusion portion, made of carbon nanofiber or graphite nanofiber, is coated with a functional film which is any one of a conductive film, a magnetic body film and a wear resistance film, wherein
   an apex angle of the protrusion portion is over 15 degrees,
   a major axis width/minor axis width ratio of a shape of a cross section orthogonal to a longitudinal direction of the wire is over 3.0, and
   a major axis width/minor axis width ratio of a shape of a cross section orthogonal to a longitudinal direction of the probe is equal to or less than 2.0, wherein the longitudinal direction extends from the distal end of the protrusion portion to a distal end of the probe.

* * * * *